United States Patent
Imoto et al.

(10) Patent No.: US 9,420,142 B2
(45) Date of Patent: Aug. 16, 2016

(54) IMAGE READING APPARATUS AND IMAGE FORMING APPARATUS

(71) Applicant: SHARP KABUSHIKI KAISHA, Osaka-shi, Osaka (JP)

(72) Inventors: Masahiro Imoto, Osaka (JP); Yasuhiro Suto, Osaka (JP); Hisashi Yamanaka, Osaka (JP); Kenji Nakanishi, Osaka (JP); Shohichi Fukutome, Osaka (JP); Kazuhiro Iguchi, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/311,586

(22) Filed: Jun. 23, 2014

(65) Prior Publication Data

US 2014/0376068 A1 Dec. 25, 2014

(30) Foreign Application Priority Data

Jun. 21, 2013 (JP) ................................. 2013-130588
Mar. 4, 2014 (JP) ................................. 2014-041893

(51) Int. Cl.
H04N 1/04 (2006.01)
H04N 1/10 (2006.01)
H04N 1/00 (2006.01)

(52) U.S. Cl.
CPC ......... *H04N 1/1026* (2013.01); *H04N 1/00278* (2013.01); *H04N 1/00557* (2013.01)

(58) Field of Classification Search
CPC ..................... H04N 1/1026; H04N 1/00278
USPC ............................ 358/497, 498, 474, 482
See application file for complete search history.

(56) References Cited

U.S. PATENT DOCUMENTS 7,224,495 B2 * 5/2007 Yui et al. ................... 358/474
7,428,081 B2 9/2008 Yamauchi

FOREIGN PATENT DOCUMENTS

JP 2003-233138 8/2003
KR 2001-0095193 * 11/2001 ............... H04N 1/04

* cited by examiner

*Primary Examiner* — Houshang Safaipour
(74) *Attorney, Agent, or Firm* — Nixon & Vanderhye P.C.

(57) ABSTRACT

An image reading apparatus includes an image scanning unit that is provided with a holding portion holding a flexible flat cable. The holding portion is protruded toward an upstream side in a sub scanning direction, and provided with a second wall part. The flexible flat cable that is extended from a connector is brought into contact with the second wall part. As for the flexible flat cable, a downward movement is regulated by a lower holding portion and an upward movement is regulated by an upper holding portion. Accordingly, the flexible flat cable does not rise.

27 Claims, 10 Drawing Sheets

IMAGE READING APPARATUS AND IMAGE FORMING APPARATUS

CROSS REFERENCE OF RELATED APPLICATIONS

The disclosures of Japanese Patent Application No. 2013-130588 filed on Jun. 21, 2013 and Japanese Patent Application No. 2014-041893 filed on Mar. 4, 2014 are incorporated herein by reference.

BACKGROUND OF THE INVENTION

1. Field of the invention

The present invention relates to an image reading apparatus that reads an image from an original and an image forming apparatus that forms an image read from an original onto a recording medium.

2. Description of the related art

Conventionally, an image reading apparatus of a flat-bed type, and an image forming apparatus such as a copying machine, a facsimile apparatus, a digital multifunction machine, etc. each being provided with such an image reading apparatus are known. Such a flat-bed type image reading apparatus is constructed such that an image scanning unit that has a light source irradiating an original with a light and a close contact type photoelectric conversion device such as a CIS (Contact Image Sensor) is arranged beneath a platen glass, and an original that is being put on the platen glass is scanned by the image scanning unit that is moved along the platen glass so as to read an image.

An example of the flat-bed type image reading apparatus is disclosed in Japanese Patent Application Laying-Open No. 2003-233138 [G03B 27/50, H04N 1/00, H04N 1/04, H04N 1/10, H04N 1/107] laid-open on Aug. 22, 2003 (Literature 1). In an image reading apparatus disclosed in this Literature 1, in order to prevent a dirt of a glass, a disconnection of the flexible flat cable and a malfunction by a flexible flat cable that connects a control board provided on a main body and an image scanning unit to each other being brought into contact with the glass, the flexible flat cable is arranged to be raised in a direction orthogonally intersecting the platen glass.

However, it is impossible to prevent the flexible flat cable from moving up and down with the movement of the image scanning unit by only simply arranging the flexible flat cable perpendicularly as in the image reading apparatus disclosed in Literature 1, and therefore, there is an occasion that the flexible flat cable is brought into with the glass.

SUMMARY OF THE INVENTION

The present invention is accomplished in view of such circumstances, and a primary object of the present invention is to provide an image reading apparatus and an image forming apparatus, capable of solving the above-described problem.

In order to solve the above-described problem, an image reading apparatus of an aspect according to the present invention comprises: a flat-plate-like transparent plate on which an original is put; a scanning portion that is provided beneath the transparent plate and has a light source that irradiates the original being put on the transparent plate with at least light; an image outputting portion that outputs an image signal according to the original based on a result that the original is scanned by the scanning portion; and belt-like signal cable that has one end connected to the scanning portion and another end connected to a circuitry portion that receives at least the image signal output from the image outputting portion, wherein the signal cable is arranged such that a width direction of the signal cable intersects a direction along a main surface of the transparent plate, and the scanning portion is provided with an upper regulating portion that regulates an upward movement of the signal cable.

In this aspect, the upper regulating portion may have a slant surface that is inclined downward as far from the one end of the signal cable.

Furthermore, in the above-described aspect, the scanning portion may be further provided with a release preventing portion that prevents the signal cable from releasing from the upper regulating portion.

Furthermore, in the above-described aspect, the scanning portion may be provided with a lower regulating portion that regulates, at a position different from the upper regulating portion in a longitudinal direction of the signal cable, a downward movement of the signal cable.

Furthermore, in the above-described aspect, the scanning portion may be provided with a connection portion where the scanning portion is connected to the one end of the signal cable such that a width direction of the one end of the signal cable becomes the direction along the main surface of the transparent plate, and a shape holding portion that holds the signal cable such that the width direction of the signal cable extended from the connection portion is changed toward a direction intersecting the main surface of the transparent plate as far from the one end.

Furthermore, in the above-described aspect, the signal cable may be brought into contact with the shape holding portion at a position lower than the connection portion of the scanning portion.

Furthermore, in the above-described aspect, the lower regulating portion may be provided in contiguity with the shape holding portion.

Furthermore, in the above-described aspect, the shape holding portion may be constructed to have a wall portion that is, in at least a part, opposite to the connection portion, and the signal cable extended from the connection portion is brought into contact with the wall portion.

Furthermore, in the above-described aspect, the wall portion may be constructed such that a first part that is opposite to a part of the connection portion is provided below the connection portion and a second part that is opposite to another part of the connection portion is extended above the first part.

Furthermore, an image reading apparatus of another aspect according to the present invention comprises: a flat-plate-like transparent plate that puts an original thereon; a scanning portion where is provided beneath the transparent plate and has a light source that irradiates the original being put on the transparent plate with at least light; and a belt-like signal cable that has one end connected to the scanning portion and another end connected to a circuitry portion that receives at least the image signal based on a result that the original is scanned by the scanning portion, wherein the signal cable is extended along a wall portion where is extended in a moving direction of the scanning portion in a state that the one end is connected horizontally with respect to a direction where the scanning portion is extended and is raised vertically from the horizontal state, and the scanning portion is provided with an upper regulating portion where regulates an upward movement of the signal cable within a section where the signal cable is changed from the horizontal state to the vertical state.

Furthermore, an image forming apparatus of an aspect according to the present invention comprises: the image reading apparatus in the above-described aspects; and an image forming portion where forms an image that is read by the image reading apparatus onto a recording medium.

The above described objects and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

Figure 1:
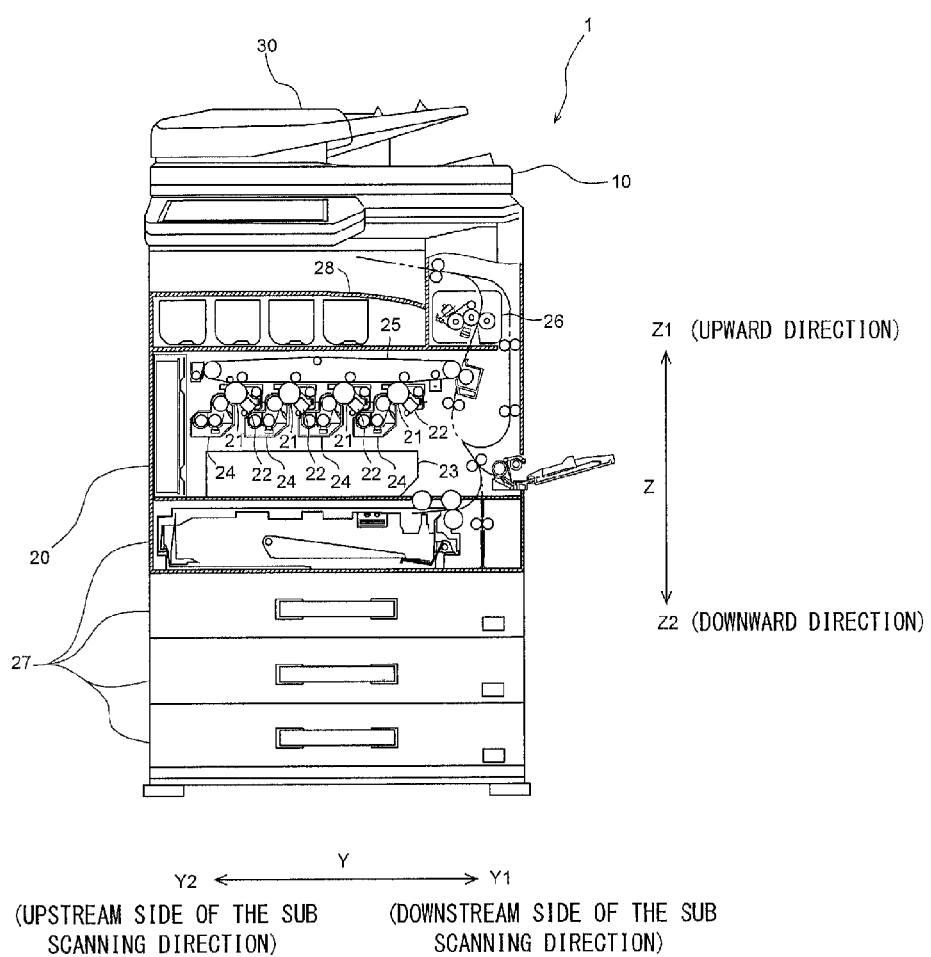
FIG. 1 is a front view showing entire structure of an image forming apparatus according to a first embodiment.

In the following, preferred embodiments according to the present invention will be described with referring to the drawings.

First Embodiment

FIG. 1 is a partially-cross-sectional view showing entire structure of an image forming apparatus according to the first embodiment.

An image forming apparatus 1 according to the first embodiment comprises an image reading apparatus 10 that reads an image from an original and a main body (an image forming portion) 20 that forms an image read by the image reading apparatus 10 onto a recording paper that is a recording medium. In FIG. 1, a Z direction is a vertical direction, and a Z1 direction shows an upward direction and a Z2 direction shows a downward direction. The image forming apparatus 1 is arranged, in a using state, on a floor in a manner that the image reading apparatus 10 is positioned above the main body 20. Furthermore, in FIG. 1, a Y direction (one direction in a horizontal direction) orthogonally intersecting a vertical direction is called as a sub scanning direction, and a Y1 direction is a downstream side of the sub scanning direction and a Y2 is an upstream side of the sub scanning direction. Furthermore, a direction orthogonally intersecting both of the Z direction and the Y direction (one direction in the horizontal direction orthogonally intersecting the Y direction, that is, an X direction in FIG. 2) is called as a main scanning direction, and one of the main scanning direction is rendered as the front (an X1 direction in FIG. 2, etc., that is, a front side) and the other of the main scanning direction is rendered as the rear (an X2 direction in FIG. 2, etc.). The structure of the image forming apparatus 1 viewed from the front is shown in FIG. 1.

The main body 20 is provided with a photoreceptor drum 21, an electrostatic charger 22, an exposure device 23, a developing device 24, a transfer device 25, a fixing device 26, a paper feed tray 27, etc. In such a main body 20, an image is formed onto a recording paper as follows:

First, a latent image is formed on a surface of the photoreceptor drum 21 by exposing by the exposure device 23 the surface of the photoreceptor drum 21 that is electrostatically charged by the charger 22 according to an image that is read by the image reading apparatus 10. Next, the developing device 24 develops the latent image that is formed on the photoreceptor drum 21 by a toner. A toner image that is thus formed on the photoreceptor drum 21 is transferred onto a transfer belt that is provided on the transfer device 25, and then, the toner image on the transfer belt is transferred on a recording paper that is fed from the paper feed tray 27. The recording paper is heated by the fixing device 26, whereby the toner image that is formed onto the recording paper is melted and mixed while the toner image is pressure-contacted with the recording paper. The recording paper after the toner image is fixed is discharged on a paper discharging tray 28 that is provided on the main body 20.

The image reading apparatus 10 is arranged above the main body 20. Furthermore, above the image reading apparatus 10, an automatic document feeder 30 that functions as a platen cover is arranged.

Figure 2:
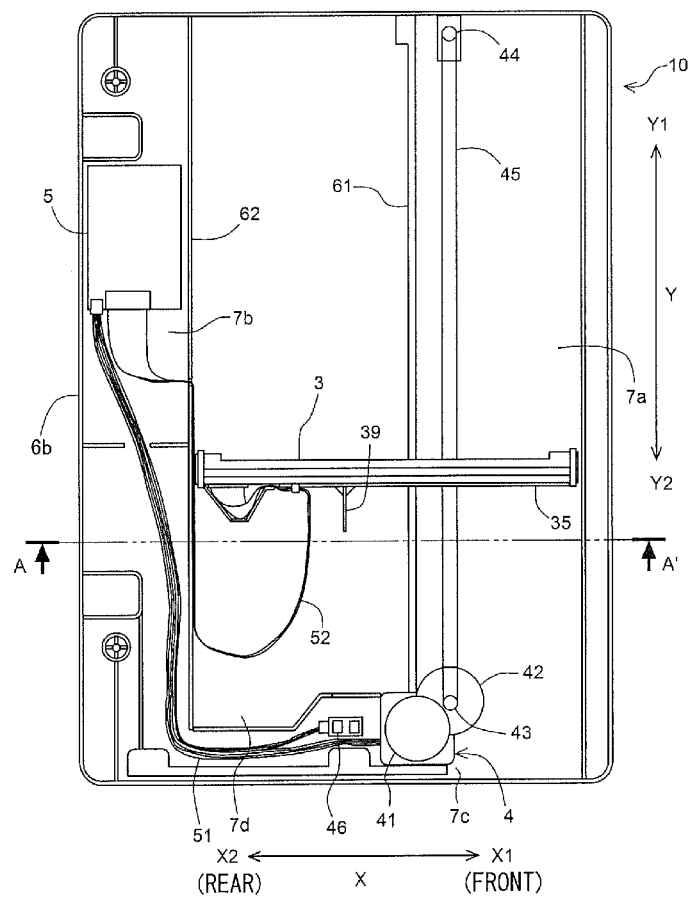
FIG. 2 is a plan view showing structure of an image reading apparatus in a state that an upper housing is removed.
Figure 3:
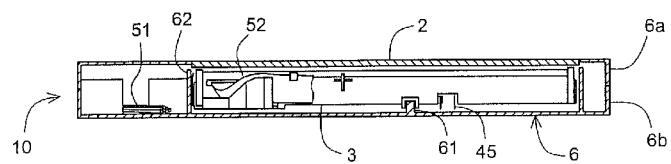
FIG. 3 is a cross-sectional view at a line A-A' shown in FIG. 2 of the image reading apparatus in a state that the upper housing is attached.

Structure of the image reading apparatus 10 will be described with using FIG. 2 and FIG. 3. The image reading apparatus 10 comprises a platen glass (transparent plate) 2, an image scanning unit (image reading portion) 3, a driving mechanism (driving portion) 4 that drives the image scanning unit 3, and a control circuit (circuitry portion) 5 that processes a signal that is output from the image scanning unit 3. Each of the image scanning unit 3, the driving mechanism 4 and the control circuit 5 is accommodated within a housing 6 that forms a rectangular parallelepiped box. The housing 6 is constructed by an upper housing 6a and a lower housing 6b. FIG. 2 is a plan view of the image reading apparatus in a state that the upper housing 6a is removed, and FIG. 3 is a cross-sectional view at a line A-A' of the image reading apparatus in a state that the upper housing 6a is attached.

The platen glass 2 is constructed by a glass having a transparency, and is used as an original table for putting an original thereon. Such a platen glass 2 is a rectangular plate larger than a maximum size of the original, and is fit into a rectangular frame of the upper housing 6a (see FIG. 3) such that the main surface thereof is extended in the horizontal direction.

Figure 4:
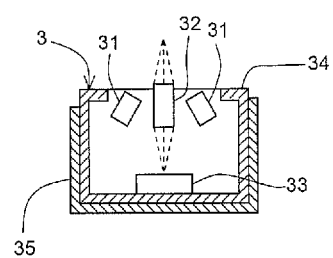
FIG. 4 is a front cross-sectional view showing structure of an image scanning unit.

FIG. 4 is a front cross-sectional view showing structure of the image scanning unit 3. The image scanning unit 3 has a pair of light source portions 31 for irradiating the original being put on the platen glass 2 with lights, a lens array 32 that is arranged between the two light source portions 31, and a line sensor 33 that receives a light that is reflected by the original and passed through the lens array 32 so as to output an electric signal according to a light amount (hereinafter, called as "image signal").

Each of the light source portions 31, the lens array 32 and the line sensor 33 is extended long in the main scanning direction (X direction in FIG. 2 and FIG. 3), and accommodated within a box-like housing 34 that is also extended long in the main scanning direction and has a slit in an upper portion thereof. Such an image scanning unit 3 is fixed to a base 35 that is extended long in the main scanning direction. The lens array 32 is constructed by a plurality of lenses that are arranged in a single line in the main scanning direction. In addition, the line sensor 33 is constructed by a plurality of photo-detectors that are arranged in a single line in the main scanning direction. The lenses of the lens array 32 and the photo-detectors of the line sensor 33 correspond to each other one-to-one, and it is constructed such that a light passing through the lens can be received by the photo-detector. By the image scanning unit 3 having such structure, the original can be scanned in the main scanning direction.

As shown in FIG. 2 and FIG. 3, there is provided with a guide rail 61 that is extended in the sub scanning direction (Y direction) in the vicinity of a center in the main scanning direction on an inner bottom surface of the lower housing 6b. To the guide rail 61, a recess portion that is formed on a bottom of the base 35 of the image scanning unit 3 is engaged. The image scanning unit 3 is slidable along the guide rail 61. That is, it is constructed such that a moving direction of the image scanning unit 3 is regulated within the sub scanning direction by the guide rail 61.

Furthermore, a wall portion 62 that is extended in the sub scanning direction is provided inside the housing 6. By the wall portion 62, a moving area 7a for the image scanning unit 3 and an area 7b for arranging the control circuit 5 are sectioned from each other.

The driving mechanism 4 includes a stepping motor 41, a plurality of gears 42 that transmit a rotation force that is output by the stepping motor 41, a driving pulley 43 that is driven by the stepping motor 41 via the gears 42, a driven pulley 44, and an endless belt 45 that is stretched between the driving pulley 43 and the driven pulley 44 (FIG. 2).

The stepping motor 41 is arranged in the vicinity of the center of the main scanning direction at an upstream side of the sub scanning direction inside the housing 6. The driving pulley 43 is arranged at a position slightly ahead of the stepping motor 41. The driven pulley 44 is arranged at a position opposite to the driving pulley 43 at a downstream side of the sub scanning direction inside the housing 6, whereby the belt 45 is extended in the sub scanning direction to be stretched between the driving pulley 43 and the driven pulley 44. That is, the belt 45 and the guide rail 61 are arranged in parallel with each other. Such a belt 45 is arranged at a position slightly ahead of the guide rail 61.

The base 35 of the image scanning unit 3 is connected to a part of the belt 45. When the stepping motor 41 is rotated, the rotation force of the stepping motor 41 is transmitted to the driving pulley 43 via the gears 42, whereby the belt 45 is moved in an orbital manner between the driving pulley 43 and the driven pulley 44. At this time, the image scanning unit 3 is moved in the sub scanning direction together with the belt 45.

If an original is put on the platen glass 2 and a reading start instruction is applied by the user, the image scanning unit 3 that is arranged at a position at the upstream side of the sub scanning direction inside the housing 6 (hereinafter, called as "initial position") is moved, in the sub scanning direction, toward a position at the downstream side of the sub scanning direction inside the housing 6 (hereinafter, called as "end position") by the driving mechanism 4 at a constant speed. During such a movement, by repeatedly scanning the original by the line sensor of the original scanning unit 3, an entire surface of the original contacting with the platen glass 2 can be scanned.

The control circuit 5 is arranged in the rear side area 7b defined by the wall portion 62 inside the housing 6. The control circuit 5 includes a driving circuit for driving the stepping motor 41, a signal processing circuit for processing the image signal that is output from the image scanning unit 3, and an electric power source circuit. Such a driving circuit 5 and the stepping motor 41 are connected to each other by a drive signal transmitting cable 51. Furthermore, the control circuit 5 and the image scanning unit 3 are connected to each other by a belt-like flexible flat cable (signal cable) 52 for transmitting the image signal.

Figure 5:
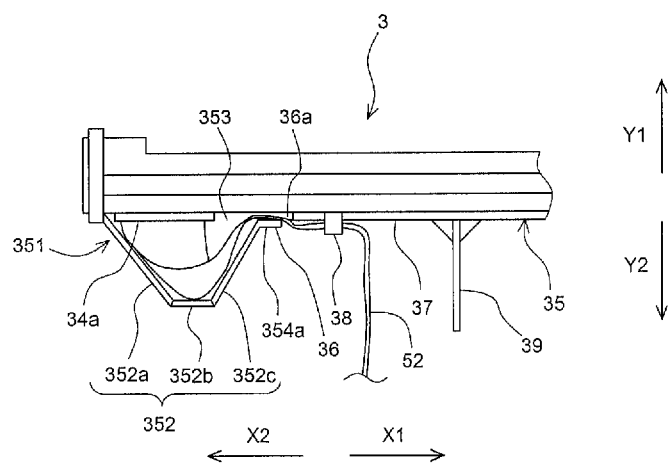
FIG. 5 is a plan view showing structure of a rear end portion of the image scanning unit.
Figure 6:
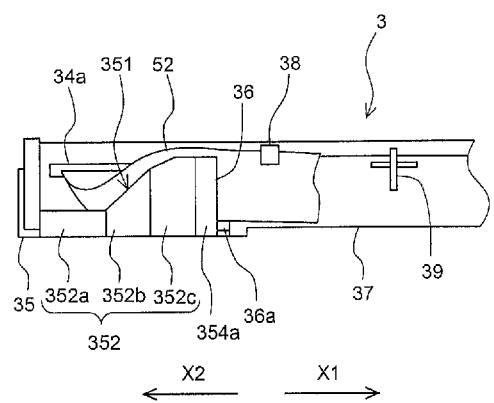
FIG. 6 is a side view showing the structure of the rear end portion of the image scanning unit.
Figure 7:
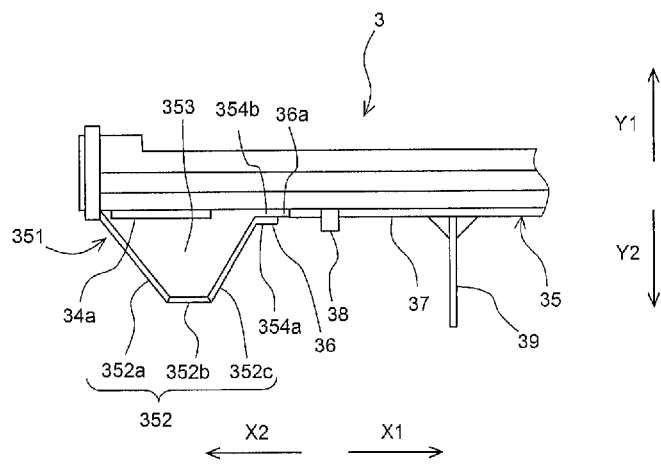
FIG. 7 is a plan view showing the structure of the rear end portion of the image scanning unit in a state that a flexible flat cable is not connected thereto.
Figure 8:
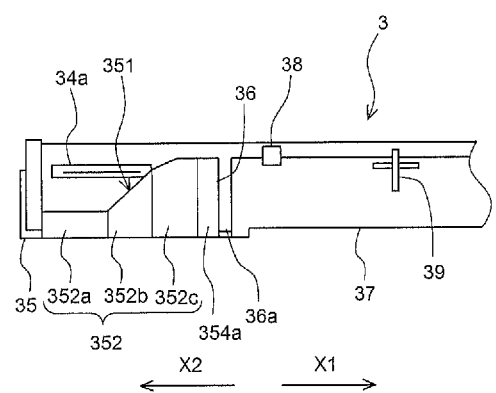
FIG. 8 is a side view showing the structure of the rear end portion of the image scanning unit in the state that the flexible flat cable is not connected thereto.
Figure 14:
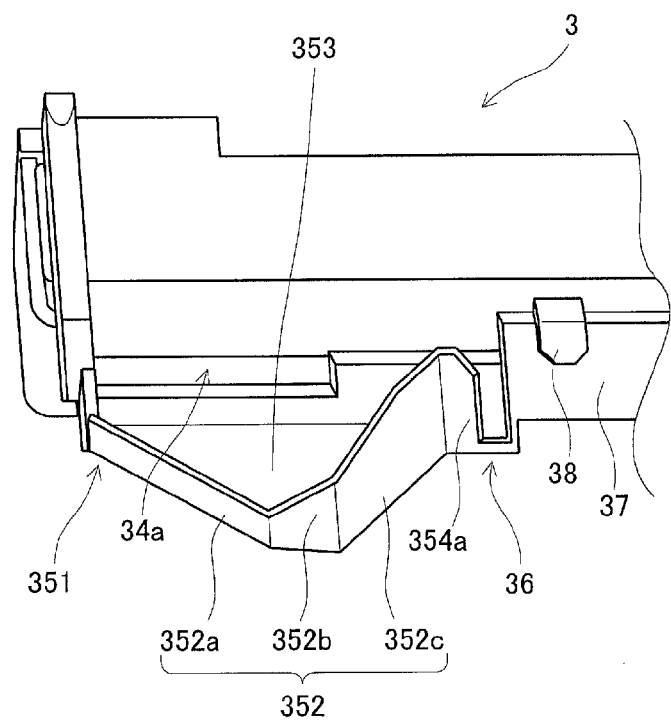
FIG. 14 is a perspective view showing the structure of the rear end portion of the image scanning unit in a state that the flexible flat cable is not connected thereto.

FIG. 5 is a plan view showing structure of a rear end portion of the image scanning unit 3 and FIG. 6 is a side view thereof. Furthermore, FIG. 7 is a plan view showing the structure of the rear end portion of the image scanning unit 3 in a state that the flexible flat cable is not connected thereto, and FIG. 8 is a side view thereof, and FIG. 14 is a perspective view thereof.

As understood by referring to FIG. 5 to FIG. 8 and FIG. 14, there is provided with a connector (connection portion) 34a for outputting the image signal in the vicinity of the rear end portion of the image scanning unit 3. To such a connector 34a, one end of the flexible flat cable 52 is connected. The connector 34a has a long shape in the main scanning direction, i.e., in a direction along the main surface of the platen glass 2, and to the connector 34a, the one end of the flexible flat cable 52 is connected such that the one end becomes long from side to side.

The base 35 of the image scanning unit 3 is provided with a holding portion (shape holding portion) 351 that holds the flexible flat cable 52. The holding portion 351 is provided to be protruded toward the upstream side of the sub scanning direction from a position beneath the connector 34a (Y2 direction in FIG. 5 and FIG. 7). Such a holding portion 351 is formed in a trapezoid shape approximately when viewed from the top. A side of a long side of the trapezoid is a base end side that is connected to the base 35, and a side of a short side is a tip end side that is protruded from the base 35.

The holding portion 351 comprises a bottom plate portion 353 and a wall portion 352 (see FIG. 5, FIG. 7, FIG. 8 and FIG. 14). The bottom plate portion 353 is in a trapezoid shape approximately as described above. The wall portion 352 is provided to be raised upward along an outer edge of the bottom plate portion 353. Such a wall portion 352 is constructed by successive three parts of a first wall part (a first part) 352a, a second wall part (a second part) 352b and a third wall part 352c.

The first wall part 352a is provided on a rear oblique side of the aforementioned trapezoid, the second wall part 352b is provided on a short side, and the third wall part 352c is provided on a front oblique side. It is constructed such that the first wall part 352a that is provided on the rear oblique side is lower than the second wall part 352b and the third wall part 352c, and the third wall part 352c that is provided on the front oblique side is higher than the first wall part 352a and the second wall part 352b.

Furthermore, the third wall part 352c that is provided on the front oblique side has a height that is constant from a front end (a portion adjacent a hiatus portion 36a (described later)) to a middle portion, and linearly inclined to be lower as going to the rear (X2 direction in FIG. 5 to FIG. 8) from the middle portion to the rear end (connection portion with the second wall part 352b). The second wall part 352b that is provided on the short side is linearly inclined to be lower as going to the rear over the whole from the front end (connection portion with the third wall part 352c) to the rear end (connection portion with the first wall part 352a).

Furthermore, a height of the second wall part 352b at the front end is identical to a height of the third wall part 352c at the rear end. The first wall part 352a that is provided on the rear oblique side has a constant height over the whole from the front end (connection portion with the second wall part 352b) to the rear end, and the height is identical to a height of the second wall part 352b at the rear end. That is, the first wall part 352a, the second wall part 352b and the third wall part 352c are connected to each other such that the height is successively changed.

Each of the first wall part 352a and the second wall part 352b is opposite to the connector 34a. Especially, the second wall part 352b is provided in parallel with the connector 34a and thus faces the connector 34a. That is, the front side portion of the connector 34a is opposite to the second wall part 352b, and the rear side portion of the connector 34a is opposite to the first wall part 352a. Furthermore, a position at an upper end of the first wall part 352a is lower than a position that the connector 34a is provided. Thus, the whole of the first wall part 352a having a lower height is opposite to the rear side portion of the connector 34a, and in the second wall part 352b facing the front side portion of the connector 34a, the height is lowered as going toward the rear, and accordingly, at a time that an operator connects the flexible flat cable 52 to the connector 34a, it is prevented that wall portion 352 from interfering the work, and therefore, it is possible to perform assembling efficiently.

As shown in FIG. 5 and FIG. 6, the flexible flat cable 52 that is connected to the connector 34a at the one end thereof is extended toward the upstream side of the sub scanning direction, and a further ahead portion thereof is turned down in an opposite direction (the downstream side of the sub scanning direction. Y1 direction in FIG. 5) while being twisted. This turned down portion is formed by turning-down the flexible flat cable 52 to be curved. That is, the flexible flat cable 52 is changed in its width direction long from side to side from the horizontal direction to the perpendicular (vertical) direction as far from the one end. By forming such a turned down portion, the flexible flat cable 52 is not formed with a fold that is to be formed when the flexible flat cable 52 is bended, and thus, a disconnection can be prevented from occurring. Such the turned down portion of the flexible flat cable 52 is stored in an interior of the holding portion 351, thereby to be brought into contact with the second wall part 352b.

Figure 9:
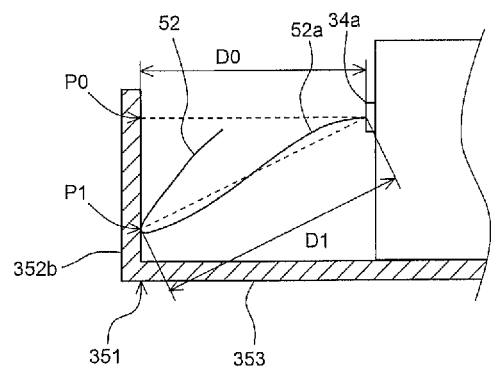
FIG. 9 is a front cross-sectional view schematically showing holding structure of the flexible flat cable by a holding portion.

Holding structure for the flexible flat cable 52 in the holding portion 351 will be described in more detail. FIG. 9 is a front cross-sectional view schematically showing the holding structure for the flexible flat cable 52 in the holding portion 351.

As shown in FIG. 9, the flexible flat cable 52 is extended toward the upstream side of the sub scanning direction from the connector 34a while being inclined downward, and turned down at a corner portion that the bottom plate portion 353 of the holding portion 351 and the second wall part 352b are connected to each other, that is, in the vicinity of the lower end of the second wall part 352b to be brought into with the second wall part 352b.

Since a contacting position P1 of the flexible flat cable 52 in the second wall part 352b is a position lower than the connector 34a, a distance D1 from the connector 34a to the contacting position P1 is longer than a shortest distance from the connector 34a to the second wall part 352b, i.e., a distance D0 from the connector 34a to the second wall part 352b in the horizontal direction. That is, the length D1 of a portion 52a (hereinafter, called as "connection end portion") from the connection place that the flexible flat cable 52 is connected to the connector 34a to the turned down place is longer than the shortest distance D0 from the connector 34a to the second wall part 352b.

Accordingly, if the connection end portion 52a that is arranged at a position lower than a position P0 that the second wall part 352b approaches the connector 34a most is to be moved upward beyond the portion P0, it is necessary to deform the connection end portion 52a; however, since flexible flat cable 52 has a flexibility as well as an elasticity, even if the connection end portion 52a is to be deformed, a force that restores such a deformation occurs by the elasticity, and therefore, the deformation is inhibited.

Furthermore, the connection end portion 52a is pushed against the second wall part 352b by such a restoring force, and therefore, the connection end portion 52a receives a drag force at a side of the connector 34a from the second wall part 352b. Accordingly, a static friction force occurs between the connection end portion 52a and the second wall part 352b.

Therefore, the connection end portion 52a is engaged with the second wall part 352b, and thus, the rise of the connection end portion 52a is prevented, whereby the connection end portion 52a can be surely held by the holding portion 351.

As described above, the front side portion of the connector 34a faces the second wall part 352b. Furthermore, the second wall part 352b is constructed such that the height thereof comes higher as going forward (FIG. 6, FIG. 8 and FIG. 14). Therefore, the front side portion of the connector 34a faces the second wall part 352b that the height is secured, and the connection end portion 52a of the flexible flat cable 52 that is extended from the connector 34a is surely brought into contact with the second wall part 352b. In addition, because the height of the second wall part 352b is secured, the connection end portion 52a that is engaged with the second wall part 352b is prevented from releasing from the second wall part 352b. Furthermore, since the turned down portion of the flexible flat cable 52 is brought into contact with the second wall part 352b as described above, the connection portion to the connector 34a of the flexible flat cable 52 is prevented from being fallen out of the connector 34a.

In addition, the structure that the connector 34a and the second wall part 352b confront to each other is adopted, but not limited to such the structure, and the connector 34a and the second wall part 352b may not be provided in parallel with each other as far as the connector 34a and the second wall part 352b are opposite to each other. If the connector 34a and the second wall part 352b are opposite to each other, since it is possible, as similar to the above, to engage the flexible flat cable 52 that is extended from the connector 34a with the second wall part 352b, the connection end portion 52a of the flexible flat cable 52 can be held.

The flexible flat cable 52 that is thus turned down at the holding portion 351 is extended toward the downstream side of the sub scanning direction while being inclined forward (X1 direction in FIG. 5) along the third wall part 352c by being applied with the twist at the turned down portion (see FIG. 5). A straight portion 354a that is extended forward (main scanning direction) is provided at a front end of the third wall part 352c, and there is provided with a hiatus portion 36a that is deeply incised from an upper side in the vertical direction further forward the straight portion 354a (see FIG. 8). The straight portion 354a is communicated with a wall portion 37 that is extended in the main scanning direction via such the hiatus portion 36a. Furthermore, at the downstream side of the sub scanning direction from the straight portion 354a, there is formed with a gap for arranging the flexible flat cable 52, and beneath the gap, a bottom plate portion 354b that follows to the bottom plate portion 353 of the holding portion 351 (see FIG. 7) is provided.

A further ahead portion of the turned down of the flexible flat cable 52 is inclined such that a plane portion turns to an oblique upper by being turned down while being twisted (see FIG. 5 and FIG. 6). An even further ahead portion thereof is twisted in a reverse direction such that the plane portion that has turned the oblique upper comes to stand substantively vertically, and inserted into the hiatus portion 36a to be supported. The hiatus portion 36a has a recess that an upper portion is opened, and a lower holding portion 36 that holds the flexible flat cable 52 from the bottom is constructed by the straight portion 354a constituting the hiatus portion 36a, the bottom plate portion 354b and the rear end portion of the wall portion 37 (see FIG. 6, FIG. 7 and FIG. 14). That is, as for the flexible flat cable 52, a downward movement is regulated by the bottom plate portion 354b. In this point, it is possible to say that the lower holding portion 36 or the bottom plate portion 354b is a lower regulating portion.

There is provided with an upper holding portion 38 that holds the flexible flat cable 52 from the top further forward from the lower holding portion 36 (see FIG. 5 to FIG. 7 and FIG. 14). The upper holding portion 38 is provided on an upper end of the wall portion 37, and forms a hook-like shape. Such an upper holding portion 38 is engaged with the upper end of the flexible flat cable 52, whereby the flexible flat cable 52 can be held by the upper holding portion 38 from the top. That is, as for the flexible flat cable 52, an upward movement is regulated by the upper holding portion 38. In this point, it is possible to say that the upper holding portion 38 is an upper regulating portion.

As described above, the flexible flat cable 52 is held at three places by the holding portion 351, the lower holding portion 36 and the upper holding portion 38.

The lower holding portion 36 as described above is provided at a position that is separated from the rear end of the connector 34a by a distance of approximately 2 times the width of the flexible flat cable 52. Furthermore, the upper holding portion 38 is provided at a position that is separated from the rear end of the connector 34a by a distance of approximately 2.5 times the width of the flexible flat cable 52 (see FIG. 5).

If the upper holding portion 38 is too far from the connector 34a, there is an apprehension that a rise occurs due to a flexion of the flexible flat cable 52 between the connector 34a and the upper holding portion 38. Furthermore, if the lower holding portion 36 is too far from the connector 34a, similarly, there is an apprehension that a rise of the flexible flat cable 52 occurs.

On the other hand, if the upper holding portion 38 is too close to the connector 34a, there is an apprehension that a wiring operation of the flexible flat cable 52 becomes difficult because it is necessary to form the above-described twist and turned-down between the connector 34a and the upper holding portion 38. If the lower holding portion 36 is too close to the connector 34a, similarly, there is an apprehension that a wiring operation of the flexible flat cable 52 becomes difficult. Therefore, by providing the lower holding portion 36 and the upper holding portion 38 at the above-described positions, it becomes possible to make a wiring operation of the flexible flat cable 52 easy while preventing the rise thereof.

The flexible flat cable 52 is extended toward the upstream side of the sub scanning direction beyond a place that the flexible flat cable is held by the upper holding portion 38, and further ahead, horizontally turned down in a U-letter shape, and then, turned behind the image scanning unit 3 passing through an outer side of the holding portion 351, and extended to the downstream side of the sub scanning direction along the wall portion 62 (see FIG. 2). A hiatus portion being vertically cut is formed on the middle portion of the wall portion 62, and the flexible flat cable 52 is brought into the area 7b that the control circuit 5 is arranged behind the wall portion 62 passing through the hiatus portion. Inside the area 7b, the flexible flat cable 52 is twisted horizontally from a state that the flexible flat cable 52 stands vertically, and in turn, connected to the control circuit 5.

As shown in FIG. 2, there is provided, in an end portion of the upstream side of the sub scanning direction inside the housing 6, with an arranging area 7c that the stepping motor 41, the gears 42 and the driving pulley 43 are arranged therein. A position at the downstream side of the sub scanning direction from the arranging area 7c is the initial position of the image scanning unit 3.

Figure 10:
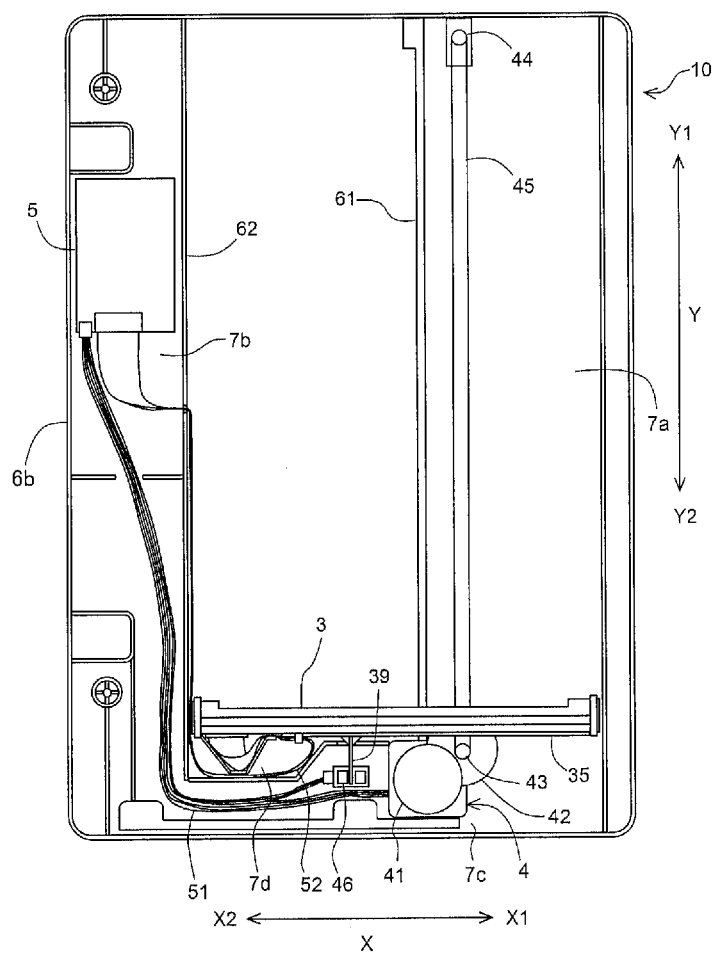
FIG. 10 is a plan cross-sectional view showing the structure of the image reading apparatus at a time that the image scanning unit is arranged at an initial position.

FIG. 10 is a plan view showing structure of the image reading apparatus 10 at a time that the image scanning unit 3 is arranged at the initial position. An initial position detecting sensor 46 including a photo-interrupter is provided in the arranging area 7c. On the other hand, a detection piece 39 is provided protuberantly toward the upstream side of the sub scanning direction at a position in front of the upper holding portion 38 on the wall portion 37 of the image scanning unit 3 (see FIG. 5 to FIG. 8). If the image scanning unit 3 is positioned at the initial position, the detection piece 39 is detected by the initial position detecting sensor 46 (see FIG. 10). Thus, it is detected that the image scanning unit 3 is at the initial position.

In FIG. 2, a state that the image scanning unit 3 is moved from the initial position to the downstream side of the sub scanning direction is shown. As shown in FIG. 2, the moving area 7a of the image scanning unit 3 is protruded toward the upstream side of the sub scanning direction behind the area 7c that the stepping motor 41, etc. are arranged. This portion is an area 7d for accommodating the holding portion 351 that is protruded toward the upstream side of the sub scanning direction from the image scanning unit 3. That is, when the image scanning unit 3 is positioned at the initial position, the holding portion 351 is accommodated in the area 7d (see FIG. 10). Thus, it is constructed such that the holding portion 351 does not interfere with other portions at a time that the image scanning unit 3 is at the initial position.

Since the flexible flat cable 52 is held from the top by the upper holding portion 38 by constructing as described above, the movement of the flexible flat cable 52 is prohibited by the upper holding portion 38 even if the flexible flat cable 52 is going to move upward. The rise of the flexible flat cable 52 is thus prevented by the upper holding portion 38, and therefore, the dirt of the platen glass 2, the disconnection of the flexible flat cable 52 and the malfunction all due to the contact of the flexible flat cable 52 with the platen glass 2 are prevented.

Furthermore, since it is constructed such that the lower holding portion 36 is provided at a position close to the connector 34a in comparison with the upper holding portion 38, and the flexible flat cable 52 is held from the bottom by the lower holding portion 36 and the flexible flat cable 52 is held from the top by the upper holding portion 38, the rise of the flexible flat cable 52 is prevented still more.

Figure 11:
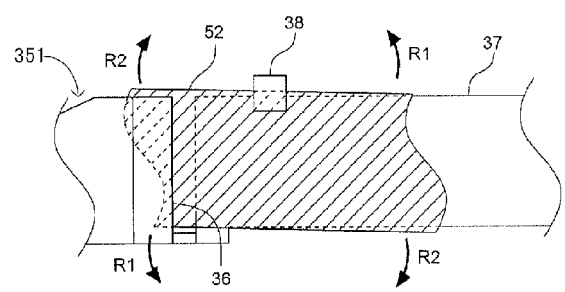
FIG. 11 is a side view schematically showing the holding structure of the flexible flat cable by a lower holding portion and an upper holding portion.

FIG. 11 is a side view schematically showing holding structure of the flexible flat cable 52. In FIG. 11, hatching by slant lines is applied to the flexible flat cable 52. As shown in FIG. 11, the flexible flat cable 52 is held by the lower holding portion 36 and the upper holding portion 38 at different positions in the horizontal direction, i.e., a longitudinal direction of the flexible flat cable 52.

At a place that the flexible flat cable 52 is held by the lower holding portion 36, and an upward movement is not regulated because the lower holding portion 36 is opened upward. On the other hand, a place that the flexible flat cable 52 is held by the upper holding portion 38, a downward movement is not regulated because the upper holding portion 38 is opened downward. That is, a turn of the flexible flat cable 52 in the counterclockwise direction shown by an arrow mark R1 in the drawing is regulated, but a turn in the clockwise direction shown by an arrow mark R2 in the drawing is not regulated. Accordingly, the rise of a portion of the flexible flat cable 52 ahead the place that is held by the upper holding portion 38 (at a side of connection to the control circuit 5) can be prevented.

Figure 12:
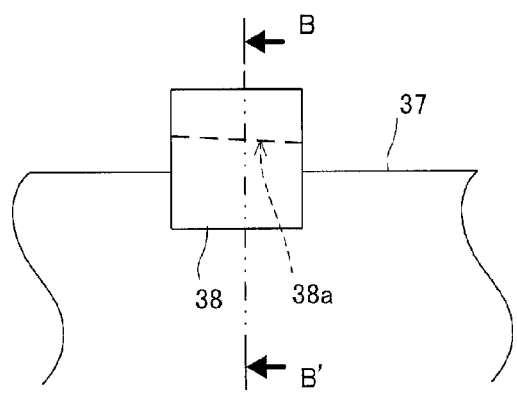
FIG. 12 is an enlarged side view of the upper holding portion.
Figure 13:
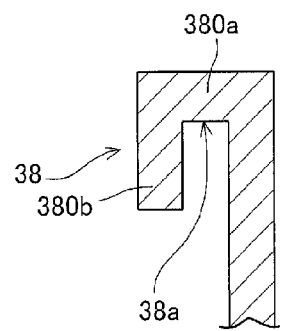
FIG. 13 is a cross-sectional view at a line B-B' shown in FIG. 12.

FIG. 12 is an enlarged side view of the upper holding portion 38 and FIG. 13 is a cross-sectional view at a line of B-B' shown in FIG. 12. As shown in FIG. 13, the upper holding portion 38 is formed in a hook-like shape that is opened downward, i.e., an inverted recess. That is, the upper holding portion 38 is constructed by a protruding portion 380a that raises from the wall portion 37 of the image scanning unit 3 and protruded toward the upstream of the sub scanning direction (Y2 direction) from the wall portion 37, and a claw portion 380b that is provided to be continued to the protruding portion 380a and in parallel with the wall portion 37.

That is, since the flexible flat cable 52 is held by the upper holding portion 38, the upward movement of the flexible flat cable 52 is regulated by the protruding portion 380a and release of the flexible flat cable 52 from the protruding portion 380a is prevented by the claw portion 380b. That is, a movement of the flexible flat cable 52 toward the upstream side of the sub scanning direction (Y2 direction) is regulated by the claw portion 380b.

Furthermore, an upper surface 38a of an interior of the upper holding portion 38 that forms such an inverted recess (a lower surface of the protruding portion 380a) is inclined to be lowered as going forward (see FIG. 12). The upper surface 38a is inclined downward as far from the connection end portion 52a of the flexible flat cable 52.

As shown in FIG. 11, the turn of the flexible flat cable 52 in a direction of the arrow mark R2 is not regulated, and the upper surface 38a of the inside of the upper holding portion 38 is inclined as describe above (see FIG. 12), and accordingly, the flexible flat cable 52 is easy to take a slightly inclined state so as to become lower as going forward. Therefore, due to this, the portion ahead of the place that the flexible flat cable 52 is held by the upper holding portion 38 (a connecting side to the control circuit 5) is prevented from rising.

Furthermore, since the holding portion 351 is provided in close to the rear of the lower holding portion 36 (adjacent to the lower holding portion 36) and the connection end portion 52a is held by the holding portion 351 as shown in FIG. 11, the rise of the connection end portion 52a is prevented and the rise of the flexible flat cable 52 at the lower holding portion 36 close to the connection end portion 52a is also prevented. Therefore, the flexible flat cable 52 is prevented from turning in the R2 direction more than necessary and thus the contact with the platen glass 2, the involution in the image scanning unit 3, etc. of the flexible flat cable 52 are prevented.

According to the first embodiment, the flexible flat cable 52 is held in three places of the holding portion 351, the lower holding portion 36 and the upper holding portion 38, and therefore, it is possible to regulate the movements of the flexible flat cable 52 upward and downward. Therefore, it is possible to prevent the flexible flat cable 52 from being brought into contact with the platen glass 2 and the inner bottom surface of the lower housing 6b. Accordingly, it is possible to prevent the platen glass 2 from being damaged and the flexible flat cable 52 from being broken before happen.

In addition, the structure that the flexible flat cable 52 is held at three places of the holding portion 351, the lower holding portion 36 and the upper holding portion 38 is described in the above-described first embodiment; however, not limited to such structure. Structure that the flexible flat cable 52 is held at two places of the lower holding portion 36 and the upper holding portion 38 by omitting the holding portion 351 may be adopted, or structure that the flexible flat cable 52 is held at only one place of the upper holding portion 38 by omitting the holding portion 351 and the lower holding portion 36 may be adopted.

Figure 15:
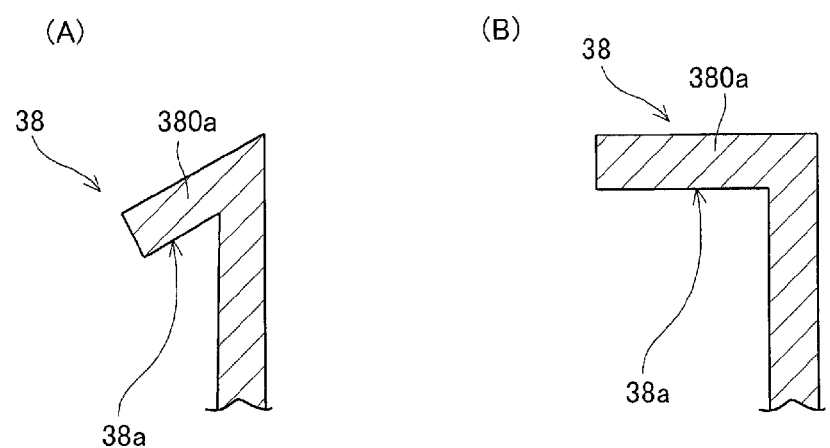
FIG. 15 is an enlarged cross-sectional view of another example of the upper holding portion.

Furthermore, in the above-described first embodiment, the upper holding portion 38 is formed in the inverted recess shape, but not limited to such the structure. The upper holding portion 38 has only to regulate the movement of the flexible flat cable 52 upward and to prevent such a regulated state from being canceled. Therefore, as shown in FIG. 15(A), the protruding portion 380a is inclined downward as going to the upstream side of the sub scanning direction, and then, the claw portion 380b may be omitted. Furthermore, as shown in FIG. 15(B), by extending the protruding portion 380a to the upstream side of the sub scanning direction (Y2 direction), the claw portion 380b may be omitted. In these cases, by means of the protruding portion 380a, the movement of the flexible flat cable 52 upward is regulated and the regulated state is prevented from being canceled.

Furthermore, in the above-described first embodiment, the control circuit 5 is provided inside the housing of the image reading apparatus 10 and the flexible flat cable 52 is connected to the control circuit 5, but the control circuit 5 may be provided at a side of the main body (image forming portion) 20 of the image forming apparatus 1. In such a case, the control circuit 5 may be included in a control circuit that is provided in the main body (image forming portion) 20 of the image forming apparatus 1.

In addition, in the above-described first embodiment, the structure that the lower holding portion 36 is provided at a position apart from the rear end of the connector 34a by a distance approximately 2 times the width of the flexible flat cable 52, but not limited to such the structure. It should be noted, however, in view of a point that the rise of the flexible flat cable 52 is to be prevented and the wiring operation is to be made easy, it is preferable that the lower holding portion 36 is provided at a position apart from the rear end of the connector 34a by a distance approximately 1.5 times to 2.5 times the width of the flexible flat cable 52.

Furthermore, in the above-described first embodiment, the structure that the upper holding portion 38 is provided at a position apart from the rear end of the connector 34a by a distance approximately 2.5 times the width of the flexible flat cable 52, but not limited to such the structure. It should be noted, however, in view of a point that the rise of the flexible flat cable 52 is to be prevented and the wiring operation is to be made easy, it is preferable that the upper holding portion 38 is provided at a position apart from the rear end of the connector 34a by a distance approximately 2 times to 3 times the width of the flexible flat cable 52.

In addition, in the above-described first embodiment, the structure that the drive signal transmitting cable 51 and the flexible flat cable 52 are connected to the control circuit 5 having the driving circuit for driving the stepping motor 41, the signal processing circuit for processing the image signal that is output from the image scanning unit 3 and the power source circuit, but not limited to such the structure. Structure that the drive signal transmitting cable 51 and the flexible flat cable 52 are not directly connected to the control circuit 5, the drive signal transmitting cable 51 and the flexible flat cable 52 are connected to a relay circuit board that relays the connection to the control circuit 5. In such a case, a circuit board that is provided with the control circuit 5 can be provided on the main body 20, and the relay circuit board and the control circuit 5 are connected to each other by a cable or the like, and the image signal that is received by the relay circuit is transmitted to the control circuit 5, and the drive signal is supplied to the stepping motor 41, etc. via the relay circuit board from the control circuit 5.

Furthermore, in the above-described first embodiment, the structure that the image forming apparatus 1 that comprises the image reading apparatus 10 and the main body 20 is described, but not limited to such the structure. It is possible to provide an image reading apparatus that does not have structure that a read image is formed on a recording medium such as a scanner apparatus of a flat-bet type, for example.

Second Embodiment

An image forming apparatus 1 according to the second embodiment is identical to the first embodiment except for different structure of an image reading apparatus, and therefore, only different points are described and a duplicate description will be omitted here.

In addition, the second embodiment will be described by using the same reference numerals or symbols for the same components as those of the first embodiment.

Figure 16:
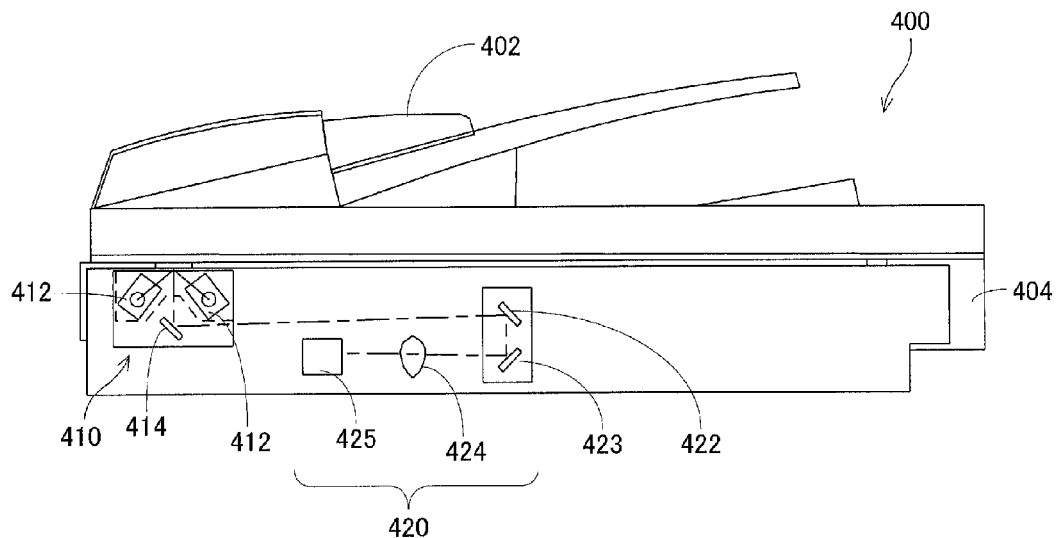
FIG. 16 is a transparent view seeing through a side surface a part of an image reading apparatus utilized in an image forming apparatus according to a second embodiment.

FIG. 16 shows an image reading apparatus 400 according to the second embodiment, which comprises an automatic feeding portion 402 that has structure that originals can be sequentially supplied and a reading portion 404 that reads an original. In addition, in FIG. 16, as for the automatic feeding portion 402, a side surface is shown and as for the reading portion 404, a state seen through the side surface.

As shown in FIG. 16, the image reading apparatus 400 comprises an image scanning unit 410 that is provided with a light source. The image scanning unit 410 comprises a pair of light source portions 412 and a first mirror 414 that is irradiated by the pair of light source portions 412 and changes an optical path of a reflected light that is reflected by the original.

The reflected light that the optical path is changed is introduced into an image signal producing portion 420 that comprises a second mirror 422, a third mirror 423, a lens 424 and an imaging device 425.

Therefore, the reflected light that is introduced into the image signal producing portion 420 is changed its optical path by the second mirror 422 and the third mirror 423, and the reflected light that the optical path is changed is focused by the lens 424 to be input to the imaging device 425. The imaging device 425 such as a CCD performs a photoelectric conversion of the reflected light to produce an electric signal (image signal). Although not shown, a produced image signal is applied to the control circuit 5 by using a signal cable.

Figure 17:
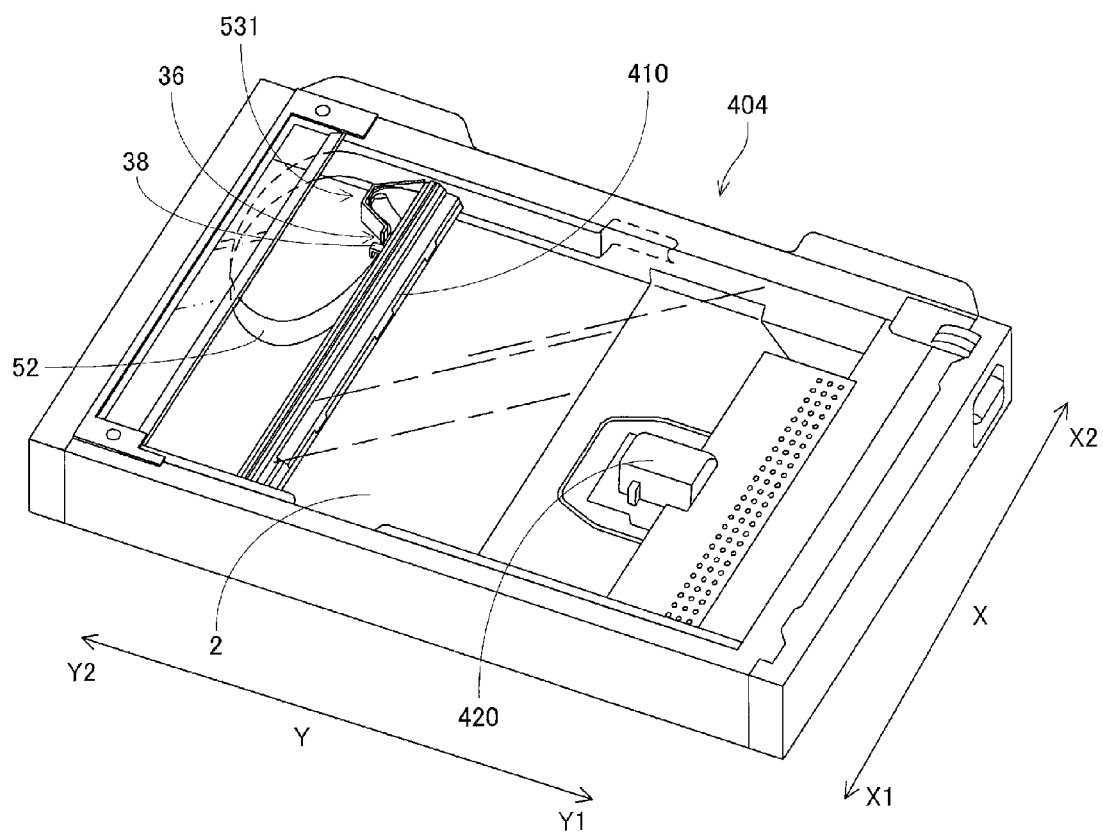
FIG. 17 is a perspective view showing structure of an image reading portion in the second embodiment.

FIG. 17 is a perspective view of the image reading portion 404 according to the second embodiment viewed from oblique above. The image reading portion 404 comprises the above-described image scanning unit 410 and the image signal producing portion 412 as shown in FIG. 17. Although not shown, the image reading portion 404 is provided with a mechanism for moving (scanning) the image scanning unit 410 and the image signal producing portion 420 in the sub scanning direction Y along the transparent plate.

As similar to the first embodiment, the image scanning unit 410 is provided with the holding portion 351, the lower holding portion 36 and the upper holding portion 38 at the upper stream side of the sub scanning direction (Y2 direction) and nearer the rear side of the main scanning direction X (X2 direction). Accordingly, the flexible flat cable 52 is held by the holding portion 351, the lower holding portion 36 and the upper holding portion 38 at the connection end portion 52a and thus movements downward and upward can be regulated.

In addition, the image scanning unit 410 in the second embodiment is applied with a control signal for scanning the original from the control circuit 5. The control signal is input through the flexible flat cable 52. In addition, a part of the flexible flat cable 52 and the control circuit 5 are omitted in FIG. 17, but these portions are identical to a case shown in the first embodiment.

According to the second embodiment, as for the image scanning unit 410 that is not provided with a mechanism for producing an image signal, by providing the holding portion 351, the lower holding portion 36 and the upper holding portion 38, it is possible to prevent the platen glass from being damaged and the flexible flat cable 52 from being broken before happen.

Third Embodiment

An image forming apparatus 1 according to the third embodiment is identical to the first embodiment except for different positions that the holding portion 351, the lower holding portion 36 and the upper holding portion 38 are provided, and therefore, only different portions will be described and a duplicate description will be omitted here.

Figure 18:
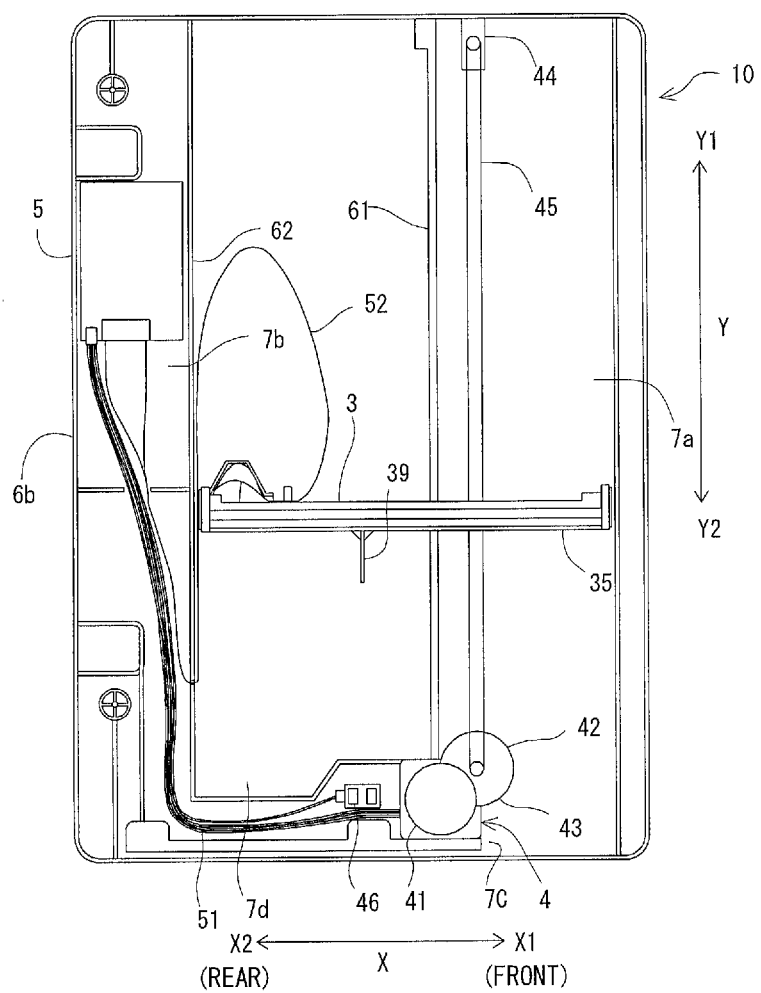
FIG. 18 is a plan view showing structure of an image reading apparatus in a state that an upper housing is removed in a third embodiment.

As shown in FIG. 18, in the third embodiment, the holding portion 351, the lower holding portion 36 and the upper holding portion 38 are provided at the downstream side of the sub scanning direction (Y1 direction) in the image scanning unit 3. In such a case, the connector 34a is also provided at the downstream side of the sub scanning direction (Y1 direction) in the image scanning unit 3.

In addition, as shown in FIG. 18, in the third embodiment, a hiatus portion is provided on the wall portion 62 at more upstream side of the sub scanning direction (Y2 direction) than the first embodiment, and the flexible flat cable 52 is brought into the area 7b passing through the hiatus portion.

Therefore, in the third embodiment, the flexible flat cable 52 is extended toward the downstream side of the sub scanning direction ahead of the place that the flexible flat cable 52 is held by the upper holding portion 38. A further ahead portion thereof is turned down horizontally in a U-letter shape, and turned forward the image scanning unit 3 through outside the holding portion 351, and is extended to the upstream side of the sub scanning direction along the wall portion 62. As described above, the hiatus portion is provided at the upstream side of the sub scanning direction (Y2 direction) from a middle portion of the wall portion 62, and the flexible flat cable 52 is brought into, via the hiatus portion, the area 7b that is the rear side of the wall portion 62 and the control circuit 5 is arranged therein. Inside the area 7b, the flexible flat cable 52 is twisted horizontally from a state that the flexible flat cable 52 is raised vertically, and connected to the control circuit 5 more ahead.

By adopting such structure, the flexible flat cable 52 can be also held by the holding portion 351, the lower holding portion 36 and the upper holding portion 38 at the connection end portion 52a, and movements downward and upward can be regulated.

In the third embodiment, it is also possible to prevent the platen glass 2 from being damaged and the flexible flat cable 52 from being broken before happen.

In addition, since the holding portion 351, the lower holding portion 36 and the upper holding portion 38 are provided at the downstream side of the sub scanning direction (Y1 direction) in the third embodiment, it is not necessary to provide the area 7d.

Furthermore, it is also possible to provide the holding portion 351, the lower holding portion 36 and the upper holding portion 38 at the downstream side of the sub scanning direction (Y1 direction) in the image reading apparatus 400 according to the second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus, comprising:
   a flat-plate-like transparent plate on which an original is put;
   a scanning portion that is provided beneath the transparent plate and that scans the original being put on the transparent plate with movement thereof, the scanning portion reading an image from the original to output an image signal; and
   a signal cable that is belt-like and has one end connected to a connection portion of the scanning portion and another end that outputs at least the image signal being output from the scanning portion, wherein
   the signal cable is arranged such that a width direction of the signal cable intersects with a plane of the transparent plate in at least a part of a length direction of the signal cable, and
   the scanning portion comprises an upper regulating portion that regulates an upward movement of the signal cable, the upper regulating portion being configured and positioned on the scanning portion such that a portion of the signal cable regulated by the upper regulating portion extends along the longitudinal direction of the scanning portion.

2. The image reading apparatus according to claim 1, wherein the upper regulating portion has a slant surface that is inclined downward as far from the one end of the signal cable.

3. The image reading apparatus according to claim 1, wherein the scanning portion is provided with a lower regulating portion that regulates, at a position different from the upper regulating portion in a longitudinal direction of the scanning portion, a downward movement of the signal cable.

4. The image reading apparatus according to claim 3, wherein
   the width direction of the one end of the signal cable is substantially parallel to the transparent plate, and
   the scanning portion comprises a shape holding portion that holds the signal cable such that the width direction of the signal cable that is extended from the connection portion is changed toward an orientation where the width direction of the signal cable is substantially perpendicular to the transparent plate.

5. The image reading apparatus according to claim 1, wherein the one end of the signal cable is arranged such that the width direction is substantially parallel to the transparent plate where it connects to the connection portion of the scanning portion, and wherein the signal cable extends along a wall portion that extends in a moving direction of the scanning portion in a state that a width direction of the signal cable is substantially perpendicular to the transparent plate.

6. An image forming apparatus, comprising:
   the image reading apparatus of the claim 1; and
   an image forming portion where an image that is read by the image reading apparatus is formed on a recording medium.

7. The image reading apparatus according to claim 1, wherein the upper regulating portion regulates a movement of the signal cable within a section where the signal cable is changed from the horizontal state to the vertical state.

8. The image reading apparatus according to claim 1, wherein the upper regulating portion includes a first protruding portion that is extended toward an upstream side of a moving direction of the scanning portion in scanning the original to regulate the movement of the signal cable in an upward direction, and a second protruding portion that is extended from an end portion of the first protruding portion downwardly to regulate the movement of the signal cable toward the upstream side in scanning the original.

9. The image reading apparatus according to claim 1, wherein said another end of the signal cable is connected to a circuitry portion that receives at least the image signal being output from the scanning portion, and
   the one end of the signal cable is connected to the connection portion of the scanning portion nearer the circuitry portion in a longitudinal direction of the scanning portion.

10. The image reading apparatus according to claim 1, wherein the one end of the signal cable is connected to the connection portion of the scanning portion in an upstream side of a moving direction of the scanning portion in scanning the original, and the upper regulating portion is provided in an upstream side of a moving direction of the scanning portion in scanning the original.

11. The image reading apparatus according to claim 1, wherein the upper regulating portion is formed integrally with the scanning portion.

12. The image reading apparatus according to claim 1, wherein the upper regulating portion is formed in a lower side than an upper surface of the scanning portion.

13. The image reading apparatus according to claim 3, wherein the lower regulating portion is formed integrally with the scanning portion.

14. The image reading apparatus according to claim 3, wherein the lower regulating portion includes a third protruding portion that is projected from the scanning portion toward an upstream side of a moving direction of the scanning portion in scanning the original.

15. The image reading apparatus according to claim 3, wherein the upper regulating portion and the lower regulating portion are provided on a side surface of the scanning portion.

16. An image reading apparatus, comprising:
   a flat-plate-like transparent plate on which an original is put;
   a scanning portion that is provided beneath the transparent plate and that scans the original being put on the transparent plate with movement thereof, the scanning portion reading an image from the original to output an image signal; and a signal cable that is belt-like and has one end connected to the scanning portion and another end that outputs at least the image signal being output from the scanning portion, wherein the signal cable is arranged such that a width direction thereof intersects with a plane of the transparent plate in at least a part of a length direction of the signal cable, and the scanning portion comprises a protruding portion including a first protruding portion that is extended toward an upstream side of a moving direction of the scanning portion in scanning the original and a second protruding portion that is extended from an end portion of the first protruding portion downwardly, wherein a part of an upper portion of the signal cable is arranged between the scanning portion and the second protruding portion such that a portion of the signal cable extends along the longitudinal direction of the scanning portion.

17. The image reading apparatus according to claim 16, wherein the protruding portion covers the upper edge of the signal cable within a section where the signal cable is changed from the horizontal state to the vertical state.

18. The image reading apparatus according to claim 16, wherein said another end of the signal cable is connected to a circuitry portion that receives at least the image signal being output from the scanning portion, and the one end of the signal cable is connected to the scanning portion nearer the circuitry portion in a longitudinal direction of the scanning portion.

19. The image reading apparatus according to claim 16, wherein the one end of the signal cable is connected to the scanning portion in an upstream side of a moving direction of the scanning portion in scanning the original, and the protruding portion is provided in an upstream side of a moving direction of the scanning portion in scanning the original.

20. The image reading apparatus according to claim 16, wherein the protruding portion is formed integrally with the scanning portion.

21. The image reading apparatus according to claim 16, wherein the protruding portion is formed in a lower side than an upper surface of the scanning portion.

22. The image reading apparatus according to claim 16, wherein the scanning portion is provided with a lower regulating portion that regulates movement of the signal cable downwardly in a position different from the protruding portion in a longitudinal direction of the scanning portion.

23. The image reading apparatus according to claim 22, wherein the lower regulating portion is formed integrally with the scanning portion.

24. The image reading apparatus according to claim 22, wherein the lower regulating portion includes a third protruding portion that is projected from the scanning portion toward an upstream side of a moving direction of the scanning portion in scanning the original.

25. The image reading apparatus according to claim 22, wherein the protruding portion and the lower regulating portion are provided on a side surface of the scanning portion.

26. An image forming apparatus, comprising:
the image reading apparatus of the claim 16; and
an image forming portion where an image that is read by the image reading apparatus is formed on a recording medium.

27. The image reading apparatus according to claim 16, wherein the second protruding portion regulates the movement of the signal cable toward an upstream side of a moving direction of the scanning portion in scanning the original.

* * * * *